(12) United States Patent
Mino

(10) Patent No.: US 7,612,121 B2
(45) Date of Patent: Nov. 3, 2009

(54) CROSS-LINKED FOAMED PRESSURE SENSITIVE ADHESIVE AND METHOD FOR PREPARING THE SAME

(75) Inventor: Yasuhiro Mino, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 918 days.

(21) Appl. No.: 10/363,447

(22) PCT Filed: Aug. 29, 2001

(86) PCT No.: PCT/US01/27015

§ 371 (c)(1),
(2), (4) Date: Feb. 26, 2003

(87) PCT Pub. No.: WO02/20687

PCT Pub. Date: Mar. 14, 2002

(65) Prior Publication Data

US 2004/0033362 A1   Feb. 19, 2004

(51) Int. Cl.
*A61F 13/15* (2006.01)
(52) U.S. Cl. ............ 521/149; 521/79; 521/99; 521/128; 428/304.4; 428/317.7
(58) Field of Classification Search .......... 521/128, 521/99, 143, 79, 149; 428/304.4, 317.7
See application file for complete search history.

(56) References Cited

U.S. PATENT DOCUMENTS

| 5,741,542 A | 4/1998 | Williams et al. |
| 5,759,679 A | 6/1998 | Kitamura et al. .......... 428/317.3 |
| 6,337,128 B1 * | 1/2002 | Oji et al. ................... 428/317.7 |

FOREIGN PATENT DOCUMENTS

| EP | 0 717 021 A2 | 6/1996 |
| JP | 55-90525 | 7/1980 |
| JP | 63-225684 | 9/1988 |
| JP | 9-78038 | 3/1997 |
| WO | WO 95/25774 | 9/1995 |
| WO | WO 99/03943 | 1/1999 |
| WO | WO 00/06637 | 2/2000 |

* cited by examiner

*Primary Examiner*—John Cooney

(57) ABSTRACT

A cross-linked foamed pressure sensitive adhesive having excellent stress relaxing property, restoration property and solvent resistance brought forth by uniform and sufficient cross-linking and foaming irrespective of transmissibility of ultraviolet rays and electron beams to components, and free from drawbacks inherent to low molecular weight acrylic copolymers. A cross-linked foamed pressure sensitive adhesive having restoration property, prepared by heating a heat cross-linkable and heat foamable composition containing a tacky polymer having a molecular weight of at least 100,000, a heat cross-linking agent and a heat foaming agent to cause cross-linking and foaming.

19 Claims, No Drawings

CROSS-LINKED FOAMED PRESSURE SENSITIVE ADHESIVE AND METHOD FOR PREPARING THE SAME

FIELD OF THE INVENTION

This invention relates to a cross-linked foamed pressure sensitive adhesive and, particularly, to such an adhesive that can be used effectively as a buffer material, a stress relaxing material, a sealing material or a combination thereof, and also to a production method thereof.

BACKGROUND OF THE INVENTION

Since a foamed body has the property of absorbing vibration, it has been used widely in the application as a sound-proofing material, a buffer material or a stress-relaxing material. As described in Japanese Unexamined Patent Publication (Kokai) No. 9-78038 and WO99/03943, the foamed body is sometimes used as a substrate of an adhesive tape or an adhesive sheet (hereinafter called the "adhesive tape, etc"), since the foamed body is superior in flexibility, and is therefore easily conformable to an adherend.

Specifically, Japanese Unexamined Patent Publication (Kokai) No. 9-78038 uses, as a substrate material, a foamed body using an elastomer such as epichlorohydrin rubber or an ethylene-propylene-diene terpolymer (EPDM) for a matrix material. However, elastomers are generally difficult-to-bond materials, and a pressure sensitive adhesive cannot be easily applied by coating or lamination. The foamed body of the epichlorohydrin rubber, in particular, contains chlorine, and a careful attention must be paid when this foamed body is discarded. The foamed body of EPDM contains large quantities of process oil. This oil is likely to bleed from the EPDM foamed body and is not much desirable for use in the pressure sensitive adhesive.

On the other hand, a foamed pressure sensitive adhesive, in which the pressure sensitive adhesive itself is a foamed body, is known, too.

For example, the WO99/03943 specification describes a foamable double-sided pressure sensitive adhesive tape produced by dispersing and packing a plurality of microcapsules in a cross-linkable tacky matrix material. According to the invention of WO99/03943, the microcapsules can impart the compression restoration force to the double-sided pressure sensitive adhesive tape, but are likely to restrict the materials of the adhesive. As a result, the adhesive tape has a low stress relaxing property and can rarely reduce the compressive load.

Japanese Unexamined Patent Publication (Kokai) No. 63-225684 describes a foamed pressure sensitive adhesive layer having both cross-linked structure and foamed structure from the aspect of improvements in heat resistance, aggregation force and stress relaxing property. More particularly, according to this Japanese Unexamined Patent Publication (Kokai) No. 63-225684, an acrylic polymer having an epoxy group (hereinafter called also as the "glycidyl group") is treated with ultraviolet rays in the presence of a diazonium salt compound to form simultaneously the cross-linked structure and the foamed structure in the foamed pressure sensitive adhesive layer. However, the acrylic polymer or other components must be selected carefully so as not to inhibit transmission of the ultraviolet rays. If the components make it difficult for the ultraviolet rays to transmit because of their black color etc., the degree of cross-linking and foaming of the acrylic polymer becomes insufficient.

Electron beams may be used in place of the ultraviolet rays. However, the electron beams cannot transmit easily ordinary materials. Therefore, cross-linking by means of the electron beams may result in the limitation of the thickness or the degree of cross-linkage.

Japanese Unexamined Patent Publication (Kokai) No. 55-90525 discloses a pressure sensitive adhesive foamed body that is foamed and cross-linked by heat-treatment in place of the UV treatment. More particularly, a starting mixture containing an acrylic type low molecular weight copolymer having reactivity with isocyanate, polyisocyanate and a foaming agent is foamed and cross-linked by heat to give a pressure-sensitive adhesive foamed body. This reference describes that the acrylic type low molecular weight copolymer has an average molecular weight of not greater than 10,000. When the acrylic polymer used has a relatively low molecular weight of not greater than 10,000, the aggregation force of the foam cannot be obtained sufficiently because the molecular chains are short. In other word, the foamed body has high tackiness on the surface and is likely to result in an aggressive pressure sensitive adhesive, and its bonding power (from normal temperature to low temperature) is as high as that of ordinary acrylic type pressure sensitive adhesive. Therefore, this foamed body involves the problem that when it is cut, it adheres to a cutting blade and the cutting work becomes difficult. Since this foamed body uses the low molecular weight copolymer, the foam is brittle and lacks sufficient tenacity. Furthermore, since it uses the low molecular weight copolymer, the viscosity is so low that a foam having a large thickness cannot be obtained.

SUMMARY OF THE INVENTION

It is an object of the present invention to provide a cross-linked foamed pressure sensitive adhesive that avoids one or more of the problems of the prior art and to provide a production method of such an adhesive. Preferably, the present invention provides a cross-linked foamed pressure sensitive adhesive that can be cross-linked and foamed uniformly and sufficiently irrespective of transmissibility of ultraviolet rays and electron beams to its components. The present inventive adhesive also exhibits one or more, and preferably all, of the following properties: excellent stress relaxing property, excellent restoration property, excellent solvent resistance, and freedom from the problem resulting from a low molecular weight acrylic type copolymer.

According to one aspect of the present invention, there is provided a cross-linked foamed pressure sensitive adhesive having a restoration property, that is obtained by heating a heat cross-linkable and heat foamable composition containing a tacky polymer having a molecular weight of at least 100,000, a heat cross-linking agent and a heat foaming agent, to cause cross-linking and foaming.

According to another aspect of the present invention, there is provided a method for producing a cross-linked foamed pressure sensitive adhesive having restoration property, that comprises the step of heating a heat cross-linkable and heat foamable composition containing a tacky polymer having a molecular weight of at least 100,000, a heat cross-linking agent and a heat foaming agent, to cause cross-linking and foaming.

According to the pressure sensitive adhesive and the production method thereof, the adhesive has at least one, and preferably all of, excellent stress relaxing property, restoration property and solvent resistance because cross-linking and foaming are attained uniformly and sufficiently. Unlike conventional methods that conduct the UV (ultraviolet) treatment, the present invention obtains the cross-linked foamed pressure sensitive adhesive by conducting cross-linking and foaming by means of heating. Therefore, foaming can be achieved uniformly and sufficiently irrespective of transmissibility of the ultraviolet rays and the electron beams to the composition. Because both foaming and cross-linking are provided at substantially the same time to the adhesive, the density of the resulting adhesive can be adjusted over a broad range. The resulting adhesive has high aggregation property, is tenacious, and can be obtained also in the form of thick foams.

The term "cross-linked foamed pressure sensitive adhesive" used in this specification means a pressure sensitive adhesive which is cross-linked and foamed by heating, and the matrix of which itself has tackiness.

DETAILED DESCRIPTION OF THE INVENTION

The present invention will be explained hereinafter with reference to preferred embodiments thereof. Needless to say, however, the present invention is in no way limited to these embodiments.

The heat cross-linkable and heat foamable composition for producing the cross-linked foamed pressure sensitive adhesive of the present invention contains a tacky polymer, a heat cross-linking agent and a heat foaming agent.

The tacky polymer is those polymers which can form the matrix of the resulting cross-linked foamed pressure sensitive adhesive and can impart tackiness to the adhesive.

The tacky polymer is generally a tacky acrylic type polymer obtained by polymerizing a polymer precursor containing a polymerizable monomer that contains mainly an acrylic monomer because the acrylic type polymer is easy to blend, has excellent weather resistance and does not exert adverse influences to the environment. This tacky acrylic type polymer has a cross-linking group capable of forming cross-linkage upon heating. To introduce the cross-linking group, the polymer precursor described above contains a cross-linkable acrylic monomer having a cross-linking group, in one aspect of the present invention. In other words, the cross-linking group can be introduced into the tacky polymer by polymerizing a mixture of polymerizable monomers containing a non-cross-linkable acrylic monomer having no cross-linking group and a cross-linkable acrylic monomer, or a mixture of a cross-linkable acrylic monomer with a polymerizable prepolymer obtained by prepolymerizing a polymerizable monomer containing a non-cross-linkable acrylic monomer. As another method, a cross-linking group can be introduced by effecting addition reaction or a modification reaction of a tacky polymer obtained by polymerizing a non-cross-linkable acrylic monomer. (In the following description, the non-cross-linkable acrylic monomer will also be called merely the "acrylic monomer".)

The acrylic monomer is at least one monomer selected from the group consisting of unsaturated mono-functional (meth)acrylate esters of non-tertiary alkyl alcohols having a relatively low polarity and their mixtures. The alkyl group of the non-tertiary alcohols has about 4 to about 12 carbon atoms. In order for the resulting adhesive to form an elastomer, the monomer described above preferably has a glass transition temperature (Tg) of from about −60° C. to about 200° C. as a homopolymer. Examples of such polymerizable acrylic monomers include n-butyl acrylate, ethyl acrylate, methyl acrylate, hexyl acrylate, 2-ethylhexyl acrylate, isooctyl acrylate, isononyl acrylate, dodecyl acrylate, lauryl acrylate, isobonyl (meth)acrylate, methyl methacrylate, 2-phenoxyethyl acrylate, benzyl acrylate and phenyl acrylate.

These acrylate or methacrylate monomers can be used either individually or as a combination of two or more monomers.

Besides the acrylic monomers having a relatively low polarity described above, the polymerizable monomer may contain, whenever necessary, a polar monomer such as lower alkyl-substituted acrylamide, N-vinylpyrolidone, N-vinylcaprolactam or N,N-dimethylacrylamide, imide acrylate, 2-hydroxyethyl acrylate, 2-hydroxyethyl methacrylate, acrylic acid, itaconic acid, fumaric acid, and maleic acid. In this case, the content of the polar monomer is maximum 45 parts by weight on the basis of 55 to 100 parts by weight of the low polarity acrylic monomer. When the polar monomer is added to the acrylic monomer in the amount falling within this range, the tackiness required for the resulting elastomer can be ensured.

As described above, the polymerizable precursor also includes the cross-linkable acrylic monomer. The cross-linkable acrylic monomer is not particularly limited so long as it is a polymerizable monomer having a cross-linking group, but is preferably an acrylic monomer having a glycidyl group, a hydroxyl group and a carboxyl group. When the cross-linkable acrylic monomer contains the glycidyl group, the heat resistance, the solvent resistance and the distortion resistance of the matrix of the adhesive can be improved after cross-linking.

This cross-linkable acrylic monomer is contained in the amount of 0.1 to 20 parts by weight per 100 parts by weight of the non-cross-linkable acrylic monomer or the polymerizable acrylic prepolymer. When the amount of the cross-linkable acrylic monomer is less than 0.1 parts by weight, sufficient cross-linkage cannot be obtained with the remarkable drop of the heat resistance, the solvent resistance and the distortion resistance of the foamed body. When the amount of the cross-linkable acrylic monomer exceeds 20 parts by weight, on the contrary, the glass transition temperature becomes so high that tackiness drops remarkably.

The tacky polymer can be obtained by polymerizing the polymerizable precursor by radiation polymerization that uses the ultraviolet rays or the electron beams (EB). The polymerization of the polymerizable precursor can be carried out by any polymerization method such as solution polymerization, emulsion polymerization, suspension polymerization and bulk polymerization in the presence of a predetermined initiator. Preferred among them is bulk polymerization because it eliminates disposal of the solvent, etc, its process is easy to carry out, it has high productivity, and it does not spoil the environment.

When the UV polymerization is conducted by any of the means described above, the initiator required for the polymerization is not limited, in particular. Examples are benzoine alkyl ether, benzophenone, benzyl methyl ketal, hydroxycyclohexylphenyl ketone, 1,1-dichloroacetophenone, 2-chlorothioxanthone, and so on. It is possible to use, for example, radical polymerization initiators commercially available with the following trademarks, such as "Irgacure" of Chiba Specialty Chemicals, "Dalocure" of Merck Japan, "Velsicure" of Bellsicol Co. Such a photo-polymerization initiator is generally used in the amount of about 0.01 to about 5 parts by weight per 100 parts by weight of the acrylate monomer.

When the polymerizable precursor contains the polymerizable prepolymer, the polymerizable prepolymer is first synthesized from an acrylic monomer other than a crosslinkable acrylic monomer by prepolymerization. The prepolymerization can be carried out by any polymerization method described above in the presence of the initiator described above.

A chain transfer agent is preferably added to the polymerizable precursor with a predetermined amount of the initiator. The chain transfer agent controls a polymerization. A molecular weight of the tacky polymer obtained by polymerization of the polymerizable precursor is at least 100,000, generally 100,000 to 5,000,00 and preferably 100,000 to 2,000,000. When the molecular weight is within this range, the foam density, the surface tackiness and appearance of the adhesive after cross-linking and foaming can be adjusted excellently by selecting the blending amounts of suitable heat cross-linking agent and heat foaming agent. Here, although polymerization of the polymerizable precursor can be completed in the above polymerization procedure, it is also possible to polymerize the polymerizable precursor at 50-100% and to complete polymerization in order to obtain the tacky polymer having the above molecular weight range during the formulation with a heat cross-linking agent and a heat foaming agent.

Concrete examples of the chain transfer agent are halogenated hydrocarbons such as carbon bromide and sulfur compounds such as isooctyl thioglycolate, octyl thioglycolate, lauryl mercaptan and butyl mercaptan.

According to the present invention, the heat cross-linkable and heat foamable composition further contains a heat foaming agent and a heat cross-linking agent in addition to the tacky polymer described above. The heat foaming agent is decomposed by heat and generates gases such as carbon dioxide, nitrogen or ammonia, and imparts a foamed structure to the resulting adhesive. Examples of the heat foaming agent are (i) inorganic foaming agents such as ammonium hydrogencarbonate and ammonium nitrite, (ii) nitroso compounds such as N,N'-dinitrosopentamethylene tetramine (DPT), (iii) azo compounds such as azodicarbonamide (AZC) and azo bis-isobutylonitrile (ABIN), and (iv) sulfonyl hydrazide compounds such as benzenesulfonyl hydrazide (BSH), toluenesulfonyl hydrazide (TSH) and p,p'-oxybis(benzenesulfonyl hydrazide) (OBSH). Known cofoaming agents may be used in combination, whenever necessary, to improve the foaming rate and to lower the foaming temperature.

The heat cross-linking agent has sensitivity to heat and can form cross-linking bonds between the tacky polymers. The cross-linking bond can impart the heat resistance, the solvent resistance and the distortion resistance to the resulting adhesive. Examples of the heat cross-linking agent are dithiocarbmates (such as zinc dimethyldithiocarbamate, zinc diethyldithiocarbamate, zinc di-n-butyldithiocarbanmate, iron dimethyldithiocarbamate, sodium dimethyldithiocarbamate, etc), ammonium organic carboxylates, various polyamines and imidazole/acid anhydrides.

In this way, the heat foaming agent and heat cross-linking agent can form the foamed structure and the cross-linking structure in the cross-linked foamed pressure sensitive adhesive. The cross-linkable and heat foamable composition for the cross-linked foamed pressure sensitive adhesive according to the present invention does not always have to transmit radiation such as the ultraviolet rays and the electron beams in order to furnish the cross-linked foamed adhesive with the foamed structure and the cross-linked structure. Therefore, when the composition of the present invention contains the radiation-impermeable components, it is more advantageous than the conventional UV cross-linkable/foamable composition because it can generate uniform and sufficient cross-linking and foaming. Examples of the radiation-impermeable components are pigments or colorants such as a black pigment, and metal fillers or inorganic fillers for forming a shield layer such as lead powder, iron powder, titanium oxide, zinc oxide, iron oxide, cerium oxide, and so forth. Since radiation transmissibility is not affected, the adhesive is not substantially limited from the aspect of the size and shape inclusive of the thickness. As a matter of fact, the thickness of the cross-linked foamed adhesive according to the present invention is generally 0.1 mm to 20 cm, suitably 0.2 mm to 10 cm, and most suitably 0.5 to 5 cm.

In the present invention, the heat foaming agent and the heat cross-linking agent should be selected suitably so that cross-linking and foaming occur substantially simultaneously by heating, or foaming can occur somewhat earlier than cross-linking. More concretely, it is possible to select the combination of iron dimethylthiocarbamate and 4,4-oxybis (benzenesulfonylhydrazide). The density and the size of the cells can also be controlled, when the blending amounts of the heat foaming agent and the heat cross-linking agent, and the molecular weight of the tacky polymer, are adjusted suitably. In practice, when said blending amounts the heat foaming agent and the heat cross-linking agent and the molecular weight of the polymer are adjusted in this way, the density of the cross-linked foamed adhesive, when it does not contain the additive such as a filler, can be controlled generally to 0.02 to 8.0 g/cm$^3$, suitably to 0.05 to 5.0 g/cm$^3$ and more suitably 0.1 to 3.0 g/cm$^3$, and the size of the cells can be controlled within the range of 10 μm to 1 nm. When the molecular weight of the polymer is 100,000 to 5,000,000, the blend amounts of the heat foaming agent and the heat cross-linking agent required for controlling the density and the cell size to the range described above are 0.01 to 10 parts by weight for the heat foaming agent per 100 parts by weight of the polymer and 0.01 to 20 parts by weight for the heat cross-linking agent per 100 parts by weight of the polymer.

When the foaming temperature of the heat foaming agent is lower than the reaction start temperature of the heat cross-linking agent, cells are formed before cross-linking starts occurring. Therefore, the cells can be disposed advantageously on the surface of the cross-linked foamed adhesive, due to diffusion. When the adhesive is bonded to an adherend, air is generally incorporated between the adhesive and the adherend. Unless this air is escaped by any means, the bonding area cannot be secured sufficiently due to the air existing between the adherend and the adhesive. Consequently, the bonding power is likely to become insufficient, and smooth bonding cannot be made. When the cells are disposed on the surface of the adhesive as described above, however, the cells on the surface constitute channels, so that the air between the cross-linked foamed adhesive and the adherend can be discharged easily to outside. As a result, the adhesive and adherend have a 100% contact surface, the initial bonding power is sufficiently exhibited, and appearance after bonding is extremely excellent.

According to the present invention, a pressure sensitive adhesive can be obtained with a low density and a low compressive load in the compressive load test as described below, as well as a sufficient restoration property. Here, the term "restoration property" means the ability of the adhesive to recover to its original form after its deformation. On the other hand, the term "compressive load in the compressive load test" is an index of how easily the adhesive can be deformed when compressed. In other words, if the compressive load of the adhesive is low, the adhesive is soft and can be deformed by application of a low pressure. A restoration property can be imparted to a pressure sensitive adhesive by charging heat expansible microspheres consisting of micro-capsules into the adhesive, and heating and expanding the heat expansible microspheres. The density of this type of adhesive can be reduced by heat expansion of the microspheres. However, if the microspheres are added to the adhesive in order to reduce the density of the adhesive to as low as that of the crosslinked foamed pressure sensitive adhesive according to the present invention, the compressive load cannot be reduced, since the microspheres themselves have rigidity and thus prohibit lowering of the compressive load. On the other hand, a crosslinked foamed pressure sensitive adhesive according to the present invention does not have to include microspheres in order to reduce the density of the adhesive. Since the density of this foamed pressure sensitive adhesive can be reduced only by means of a gas, the compressive load and density of the adhesive can be lowered and thus the resulting adhesive has excellent stress-relaxing properties. Specifically, the compressive load of the adhesive according to the present invention, when the adhesive having an initial thickness of 10 mm is compressed to 25% of its initial thickness at a rate of 10 mm/mm in the thickness-wise direction, can be lowered from 50 N/cm$^2$ to 0.1 N/cm$^2$, in the case where the density of the adhesive is lowered from 3.0 g/cm$^3$ to 0.1 g/cm$^3$.

The cross-linked foamed adhesive described above can be shaped into the sheet form by using a heat cross-linkable and heat foamable composition in the following way.

The tacky polymer, the heat cross-linking agent and the heat foaming agent, that are prepared in advance, are kneaded by using a uniaxial or biaxial extruder, a Banbury mixer, a kneader, or an intermix, to give a heat cross-linkable and heat foamable composition. Next, this composition is shaped into a sheet form by rolling using a heat press machine or a calendar roll, or by extrusion using a die, at a temperature lower than the activation temperatures of both heat cross-linking agent and heat foaming agent such as 60 to 100° C. This sheet is then passed through an oven or a funnel cure, and is heated to a temperature higher than the activation temperatures of both heat cross-linking agent and heat foaming agent, such as 140 to 180° C., to cause foaming and cross-linking.

Though the present invention has been explained about its embodiment, but is not limited thereto.

For example, it is possible to add suitably a non-cross-linkable plastic matrix to the heat cross-linkable and heat foamable composition, whenever necessary, so as to impart mechanical strength, elasticity and cold impact resistance to the cross-linked foamed adhesive, such as rigidity, tensile strength and elongation. Examples of such a non-cross-linkable thermoplastic matrix are various rubbers, elastomers such as polyethylene or polypropylene resin, styrene-butadiene rubber (SBR), acrylonitrile-butadiene rubber (NBR), polybutadiene rubber (BR), butyl rubber (IIR), styrene-isoprene-styrene block copolymer (SIS), styrene-butadiene-styrene block copolymer (SBS), and styrene-ethylene/butylene-styrene block copolymer (SEBS), and thermoplastic polymers.

Besides the mere addition described above, it is also possible to add a cross-linkable plastic matrix to the heat cross-linkable and heat foamable composition so as to incorporate it into a part of the cross-linked structure of the cross-linked foamed composition. Examples of the cross-linkable plastic matrix are granular elastomers or elastomers prepared by adding an epoxy group or a hydroxyl group, a carboxyl group, a chlorine group or an active chlorine group to the olefin resin, the synthetic rubber or the cross-linked rubber described above, or a cyanate esters or poly(ethyl oxazoline) having a structure analogous to the epoxy group. In such a case, the compressive permanent set resistance and toughness can be improved because the cross-linkage develops. Particularly, the elastomer can improve the cold resistance of the cross-linked foamed adhesive. The isocyanate ester or poly(ethyl oxazoline) can react with the epoxy group (glycidyl group) in the absence of a catalyst and can improve the heat resistance.

It is further possible to add heat expansible micro-spheres to the cross-linkable and foamable composition so as to adjust suitably the properties of the cross-linked foamed adhesive (such as compressive permanent set and repulsive power). Particularly when the heat expansible micro-spheres have hollow portions incorporating low boiling point hydrocarbons, the density can be lowered in proportion to the addition amount. Since the shell itself of the micro-spheres does not have tackiness, the punching property of the matrix of the adhesive can be improved by adding the micro-spheres. Since the micro-spheres restrict the matrix of the adhesive, the strength in the shearing direction can be improved. However, caution should be taken such that the stress relaxing property of the adhesive does not drop excessively.

Organic and inorganic fillers may be further added so as to improve dynamic performance and processing property of the cross-linked foamed adhesive and to lower the product cost. Examples of the inorganic fillers are metal oxides such as carbon black, silicic acid, silicates, carbonates, titanium oxide and zinc oxide, metal fibers and glass bubbles. Examples of the organic filler are high styrene resin, cumarone-indene resin, phenol resin, lignin or powdery rubber, and plastic bubbles. If the fillers including heat expansible micro-spheres are formulated into the pressure sensitive adhesive of the present invention, a compressive load of the adhesive can be increased to 300 N/cm$^2$, when an initial thickness of the adhesive is 10 mm, and the adhesive is compressed to 25% of an initial thickness at a rate of 10 mm/min in a thickness-wise direction.

Various additives such as an anti heat-aging agent, an anti ozone-degradation agent, a softening agent, a plasticizer, a thickener, a lubricant, a colorant, an antistatic agent, an antimicrobial agent, a UV absorber, a flame retardant, and so forth, may be further added, whenever necessary.

The cross-linked foamed pressure sensitive adhesive according to the present invention may have a multi-layered structure comprising two or more pressure sensitive adhesives depending on the kind of adherend, and may contain a film, a non-woven fabric and a woven fabric. They can be produced by means such as multi-layered co-extrusion or lamination.

The present invention uses a tacky polymer having a relatively high molecular weight of at least 100,000. Therefore, the pressure sensitive adhesive of the present invention has the following advantages in comparison with the conventional heating type pressure sensitive adhesives. (1) Since the foam itself has low tackiness, it can be easily peeled from the adherend after it is bonded, and has therefore re-peelability. Accordingly, the adhesive of the present invention is extremely advantageous for bonding to an adherend having a large area. (2) Since the viscosity of the composition before foaming is relatively high and can be coated with a large thickness, a thick foam can be formed. (3) Cutting process is easy. (4) A tenacious adhesive can be obtained.

The resulting adhesive can be used as a sealing material for burying discontinuous portions such as gaps, or a sound-proofing material. Particularly, the adhesive can be used as a flexible adhesive for burying the gaps with a substrate when an interior trim of an automobile is disposed at predetermined positions. Since the adhesive of the present invention has re-peelability, it can be fitted to the adherend or the substrate, then removed, and thereafter fitted once again.

EXAMPLES

1. Preparation of Samples

Samples of sheet materials were produced in the following way.

Example 1

First, polymerizable monomers and an initiator were charged into a jar to prepare a mixture. In this example, 80 parts by weight of 2-ethylhexyl acrylate and 20 parts by weight of N,N-dimethylacrylamide were used as the polymerizable monomers. 0.04 parts by weight of a photo-initiator, that was commercially available under the trade name "Irgacure 651" from Chiba Specialty Chemicals, was used as the initiator. Purging from the jar was conducted by using nitrogen. Ultraviolet rays were irradiated to the mixture from a fluorescent black lamp (Sylvania F20T12B) in which 90% of the radiation rays were 300 to 400 nm and which had maximum at 351 nm. This photo-initiator was activated to start to polymerize the polymerizable monomers and to prepare the polymerizable prepolymer. In this example, this polymerization was continued until the viscosity of the prepolymer reached about 3,000 mPa·S (25° C.).

Next, while the mixture containing the prepolymner described above was being stirred, 3 parts by weight of a cross-linkable acrylic monomer consisting of glycidyl methacrylate, 0.1 parts by weight of the photo-initiator consisting of Irgacure (trade name) and 0.03 parts by weight of a chain transfer agent consisting of carbon tetrabromide were added. After the jar was degassed, the ultraviolet rays described above were again irradiated to the mixture to further polymerize the unreacted monomers in the mixture and to prepare a tacky polymer. When measured by GPC using HP1090 series II of Agilent Co, the resultant polymer was found to have a molecular weight of at least 100,000, and 80% of the total molecular weight distribution was occupied by polymers having a molecular weight of 100,000 to 5,000,000, and 75% of the total molecular weight distribution was occupied by polymers having a molecular weight of 100,000 to 2,000,000. Thus, this polymer has a molecular weight of at least 100,000.

Next, the tacky polymer was charged into a biaxial extruder and was kneaded at 80° C. Thereafter, 1.0 parts by weight of stearic acid as a lubricant, 30 parts by weight of SRF carbon black as a filler, 1.5 parts by weight of zinc dimethyldithiocarbamate and 1.0 parts by weight of iron dimethyldithiocarbamate as heat cross-linking agents, and 5.0 parts by weight of 4,4-oxybis(benzenesulfonyl hydrazide) as a heat foaming agent were added from the intermediate portion of the cylinder of the biaxial extruder to form a heat cross-linkable and heat foamable composition. This heat cross-linkable and heat foamable composition was extrusion-molded through an extrusion die to obtain a sheet having a thickness of 1 mm.

Next, this sheet was put into an oven and heat-treated at 170° C. for 15 minutes to complete foaming and cross-linking and to obtain a sample of a cross-linked foamed adhesive. The adhesive had a thickness of 4 mm.

Example 2

A sample of a cross-linked foamed adhesive was produced in the same way as in Example 1 with the exception that a monomer component consisting of 85 parts by weight of 2-ethylhexyl acrylate and 15 parts by weight of N,N-dimethylacrylamide was used in place of 80 parts by weight of 2-ethylhexyl acrylate and 20 parts by weight of N,N-dimethylacrylamide. When measured by GPC using HP1090 series II of Agilent Co, the resultant polymer was found to have a molecular weight of at least 100,000, and 80% of the total molecular weight distribution was occupied by polymers having a molecular weight of 100,000 to 5,000,000, and 75% of the total molecular weight distribution was occupied by polymers having a molecular weight of 100,000 to 2,000,000. Thus, this polymer has a molecular weight of at least 100,000. The adhesive had a thickness of 5 mm.

Example 3

A sample of a cross-linked foamed adhesive was produced in the same way as in Example 1 with the exception that a monomer component consisting of 89 parts by weight of 2-ethylhexyl acrylate and 11 parts by weight of N,N-dimethylacrylamide was used in place of 80 parts by weight of 2-ethylhexyl acrylate and 20 parts by weight of N,N-dimethylacrylamide. When measured by GPC using H1090 series II of Agilent Co, the resultant polymer was found to have a molecular weight of at least 100,000, and 80% of the total molecular weight distribution was occupied by polymers having a molecular weight of 100,000 to 5,000,000, and 75% of the total molecular weight of distribution was occupied by polymers having a molecular weight of 100,000 to 2,000,000. Thus, this polymer has a molecular weight of at least 100,000. The adhesive had a thickness of 3 mm.

Example 4

A sample of a cross-linked foamed adhesive was produced in the same way as in Example 1 with the exception that 30 parts by weight of an epoxy type acryl rubber having an epoxy group as a cross-linkable group (Nopol AR53L, a product of Nippon Zeon K.K.) was further added from a feed portion at an intermediate part of the cylinder of the biaxial extruder. When measured by GPC using HP1090 series II of Agilent Co, the resulting polymer was found to have a molecular weight of at least 100,000, and 80% of the total molecular weight distribution was occupied by polymers having a molecular weight of 100,000 to 5,000,000, and 75% of the total molecular weight distribution was occupied by polymers having a molecular weight of 100,000 to 2,000,000. Thus, this polymer has a molecular weight of at least 100,000. The adhesive had a thickness of 2.8 mm.

Example 5

A sample of a cross-linked foamed adhesive was produced in the same way as in Example 1 with the exception that 80 parts by weight of butyl acrylate was used in place of 80 parts by weight of 2-ethylhexyl acrylate. When measured by GPC using HP1090 series II of Agilent Co, the resultant polymer was found to have a molecular weight of at least 100,000, and 80% of the total molecular weight distribution was occupied by polymers having a molecular weight of 100,000 to 5,000,000, and 75% of the total molecular weight distribution was occupied by polymers having a molecular weight of 100,000 to 2,000,000. Thus, this polymer has a molecular weight of at least 100,000. The adhesive had a thickness of 5 mm.

Example 6

A sample of a cross-linked foamed adhesive was produced in the same way as in Example 1 with the exception that extrusion molding was conducted to obtain a sheet having a thickness of 10 mm in place of 1 mm in Example 1. When measured by GPC using HP1090 series II of Agilent Co, the resultant polymer was found to have a molecular weight of at least 100,000, and 80% of the total molecular weight distribution was occupied by polymers having a molecular weight of 100,000 to 5,000,000, and 75% of the total molecular weight distribution was occupied by polymers having a molecular weight of 100,000 to 2,000,000. Thus, this polymer has a molecular weight of at least 100,000. The adhesive had a thickness of 40 mm.

Comparative Example 1

Monomers consisting of 90 parts by weight of isooctyl acrylate and 10 parts by weight of acrylic acid, 0.14 parts by weight of Irgacure 651 (trade name) and 0.03 parts by weight of a chain transfer agent, i.e. 2-ethylhexyl thioglycolate (OTG, product of Wako Junyaku K. K.), were mixed inside a jar. Ultraviolet rays were irradiated to this mixture to polymerize the monomer and to prepare a polymer.

The mixture was charged into a biaxial extruder with a heat foaming agent consisting of 5.0 parts by weight of 4,4-oxybis (benzenesulfonylhydrazide) and was mixed. The mixture was then extrusion-molded through an extrusion die to obtain a sheet having a thickness of 1 mm. The sheet was heat-treated at 170° C. for 7 minutes, and only foaming was completed. Subsequently, electron beams accelerated by a voltage of 300 KeV were irradiated once in a dose of 16 Mrad to both surfaces of this sheet to achieve cross-linking and to produce a comparative sample. The adhesive had a thickness of 5 mm.

Comparative Example 2

A polymer was prepared in the same way as in Comparative Example 1. Unlike Comparative Example 1, however, the polymer of this comparative example was heated to 80° C. after being charged into the biaxial extruder and was kneaded. Also, 4.0 parts by weight of microcapsules (F-80D, trade name, a product of Matsumoto Yushi-Seiyaku K. K.) was further supplied from an intermediate part of the cylinder of the biaxial extruder and was mixed with the polymer. Thereafter, the polymer was passed through an extrusion die that was heated in advance to 180° C. While the polymer was caused to foam by the microcapsules, it was extrusion-molded into a sheet having a thickness of 1 mm. Subsequently, electron beams accelerated by a voltage of 300 KeV were irradiated once in a dose of 6 Mrad to both surfaces of the sheet to achieve cross-linking and to prepare a comparative sample. The adhesive had a thickness of 1.0 mm.

Comparative Example 3

Monomers consisting of 90 parts by weight of isooctyl acrylate and 10 parts by weight of acrylic acid and 0.14 parts by weight of Irgacure 651 (trade name) were mixed inside a jar. The ultraviolet rays described above were then irradiated to this mixture and activated the initiator so that the monomer could be polymerized to prepare a prepolymer. This polymerization was continued until the viscosity of the prepolymer reached about 3,000 mPa·s (25° C.).

Next, while the mixture containing the prepolymer was being mixed, a cross-linkable acrylic monomer comprising 0.1 part by weight of Irgacure 651 (trade name) and a cross-linkable monomer consisting of 0.8 parts by weight of 1,6-hexanediol diacrylate (HDDA), 6 parts by weight of hollow glass micro-spheres (glass bubbles C15-250, product of 3M Co), 1.5 parts by weight of a filler consisting of hydrophobic silica (R-972, product of Nippon Aerosol K. K.) and 3.0 parts by weight of a surfactant were added to the mixture. While the mixture was being transferred to a bubbler rotating at 900 rpm, and the foamed mixture was passed through a pipe having a diameter of 12.5 mm and was delivered between the nips of roller coaters at which a pair of transparent polyethylene terephthalate films oriented in biaxial directions and having low bondability on the surface were disposed. Polymerization and cross-linking were completed by the irradiation of ultraviolet rays 90% of which was within the wavelength band of 300 to 400 nm and which had maximum at 351 nm. In this way, a comparative sample having a thickness of 1.0 mm was produced.

Comparative Example 4

A comparative sample of a foamed sheet (Eptosealer No. 685, product of Nitto Denko K. K.: 5.0 mm) that consists of EPDM and is used generally in the sealing application was provided.

2. Evaluation of Samples

The sample of each Example and Comparative Example was evaluated by the following measurement and test.

(1) Compressive Load Measurement

Each sheet sample was cut to obtain several square sheets of 25 mm×25 mm. The sheets were laminated with one another in such a fashion as to discharge the air bubbles between them, and a test piece having a thickness of about 10 mm was produced (For example 6, a sample having a thickness of 40 mm was used as a test piece.). After the correct thickness (hereinafter called the "initial thickness") was measured for each test piece, each test piece was compressed at a compression rate of 10 mm/min by using a compression tester (AUTOGRAPH, product of Shimazu Seisakusho K. K.). The compressive loads at the points at which the thickness of the test piece reached 25% and 40% of the initial thickness were determined.

(2) Measurement of Compressive Permanent Strain

After the correct thickness ($t_0$) of the test piece described above was measured, the test piece was compressed at a compression rate of 10 mm/min by using the compression tester described above to a thickness of 40% of the initial thickness. The test piece so compressed was left standing with this thickness under the standard state (temperature 23° C.±1° C., relative humidity 50±2%) for 24 hours. The test piece was then removed from the compression tester and the final thickness ($t_1$) after compression was measured, The compression permanent strain C (%) was calculated from these initial thickness ($t_0$) and final thickness ($t_1$) in accordance with the following equation:

$$C = 1 - (t_1/t_0) \times 100$$

(3) Restoration Test

After the correct initial thickness ($t_0$) of the test piece described above was measured, the test piece was compressed at a compression rate of 10 mm/min by the compression tester also described above to a thickness of 80% of the initial thickness. The test piece so compressed was left standing under the standard state. The test piece was then removed from the compression tester. The final thickness after compression was measured to check whether or not the initial thickness coincided with the final thickness. The test pieces were deemed to pass when the ratio (initial thickness/final thickness) was 1.1 or below, and were deemed to fail when the ratio 1.2 or more.

(4) Surface Tack Test

The test piece described above was pressed to a white coated panel by using a 2 kg roller. This white coated panel was obtained by applying an acryl-melamine paint currently used as a car paint to a stainless steel panel, and then causing cross-linking. The white coated panel was then erected in a vertical direction, and whether or not the panel body falls by its own weight was inspected. The test piece was deemed to pass when the panel body did not fall, and was deemed to fail if it did.

(5) Wet Surface Area Test

The test piece was cut into 50 mm×50 mm and was merely bonded to one of the surfaces of a transparent acryl sheet having a thickness of 5 mm without using a spatula, or the like. The bonding area (S mm$^2$) of the test piece to the acryl sheet was measured. A wet area ratio (W) was calculated by the following equation:

$$W(\%) = S/2{,}500 \text{ mm}^2 \times 100$$

(6) Solvent Resistance Test

The test piece was cut into a rectangle of 10 mm×20 mm, was immersed in a solvent consisting of methyl ethyl ketone (MEK) and was left standing for 24 hours to check whether or not it is swollen. The test piece was deemed to pass when it did not swell by visual inspection and was deemed to fail if it did.

Table 1 illustrates the results of the measurement/tests described above for Examples and Comparative Examples.

It could be seen from Table 1 that the samples of Examples 1 to 6 were cross-linked sufficiently, did not generate the compressive strain, but had the restoration property and the solvent resistance. In contrast, the sample of Comparative Example 1 had a relatively low density, hence a low compressive load, but was inferior in the restoration property as proved by leaving the compressive strain, and did not have the solvent resistance. This was presumably because cross-linkage was not sufficient. The sample of Comparative Example 2 had the restoration property but obviously had a relatively high compressive load in comparison with its low density. It did not have the solvent resistance. The sample of Comparative Example 3 was inferior in the restoration property as proved by leaving the compressive strain, and did not have the solvent resistance. It could be understood that this sample could not reduce either the density or the compressive load due to the production process. This was because this comparative example did not use the foaming agent and cells were formed mechanically by using the bubbler. It could been seen that the sample of Comparative Example 4 not only had the solvent resistance but also could decrease the density and the compressive load. However, this sample did not have the surface tack by itself, and an adhesive had to be interposed between the sample and the adherend to bond them together.

In connection with the wet surface area test, Examples 1 to 6 exhibited the excellent wet area ratios in comparison with Comparative Examples 2, 3 and 4. Since Examples 1 to 6 could easily discharge air between the adhesive and the adherend, they had a 100% contact surface, exhibited sufficiently the initial bonding strength and provided extremely good appearance after bonding.

Unlike the conventional pressure sensitive adhesive that are subjected to the UV treatment, the cross-linked foamed pressure sensitive adhesive according to the present invention is one obtained by effecting cross-linking and foaming by means of heat. Therefore, cross-linking and foaming are achieved sufficiently and uniformly irrespective of transmissibility of the ultraviolet rays and the electron beams to the components of the composition. Since cross-linking and foaming are allowed to occur uniformly and sufficiently, the adhesive of the present invention has excellent stress relaxing property, restoration property and solvent resistance. Since foaming and cross-linking are provided simultaneously by heat to the adhesive, the density of the resulting adhesive can be adjusted over a broad range. In comparison with the conventional heat cross-linking type adhesive, the foam itself of the adhesive of the present invention has weak bonding power. Therefore, when the foam is bonded to the adherend, the adhesive can be easily peeled from the adherend, or in other words, can have re-peelability. Therefore, the adhesive of the present invention is extremely advantageous for bonding to adherend having a large area. The composition has a relatively high viscosity before foaming and can be coated with a large thickness. Therefore, a thick foam can be formed. Furthermore, cutting process is easy in the adhesive of the present invention, and a tenacious adhesive can be obtained.

TABLE 1

| | | Example 1 | Example 2 | Example 3 | Example 4 | Example 5 | Example 6 |
|---|---|---|---|---|---|---|---|
| density | g/cc | 0.24 | 0.2 | 0.34 | 0.35 | 0.2 | 0.28 |
| compressive load (25%) | N | 7.6 | 2.7 | 11.3 | 15.8 | 4.6 | 5.5 |
| compressive load (40%) | N | 12.7 | 4 | 18.8 | 26.3 | 7.8 | 12.1 |
| compressive strain | % | 0 | 0 | 0 | 0 | 0 | 0 |
| restoration property | | pass | pass | pass | pass | pass | pass |
| surface tack test | | pass | pass | pass | pass | pass | pass |
| wet area | % | 100 | 100 | 100 | 100 | 100 | 100 |
| solvent resistance test | | pass | pass | pass | pass | pass | pass |

| | | Comparative Example 1 | Comparative Example 2 | Comparative Example 3 | Comparative Example 4 | Comparative Example 5 |
|---|---|---|---|---|---|---|
| density | g/cc | 0.2 | 0.25 | 0.52 | 0.15 | 0.27 |
| compressive load (25%) | N | 9.6 | 72.7 | 37.8 | 2.4 | 10.4 |

TABLE 1-continued

|  |  |  |  |  |  |  |
|---|---|---|---|---|---|---|
| compressive load (40%) | N | 20.6 | 113.4 | 74.5 | 3.9 | 17.4 |
| compressive strain | % | 2 | 0 | 3.8 | 0 | 0 |
| restoration property |  | failure | pass | failure | pass | pass |
| surface tack test |  | pass | pass | pass | failure | failure |
| wet area | % | 100 failure | 75 failure | 85 failure | not bonded pass | * * * pass |
| solvent resistance test |  |  |  |  |  |  |

Note)
***: Test was not conducted.

The invention claimed is:

1. A method for producing a pressure sensitive adhesive comprising:
   (a) rolling into a sheet or extruding a mixture comprising a tacky acrylic polymer having a weight average molecular weight of at least 100,000 g/mol, a heat cross-linking agent, and a heat foaming agent that decomposes to generate a gas upon heating, wherein the mixture is free of expandable, polymeric microspheres, and
   (b) heating the mixture to a temperature higher than the activation temperatures of both the cross-linking agent and the heat foaming agent to cause foaming and cross-linking at substantially the same time,
   wherein the resulting cross-linked foamed pressure sensitive adhesive has a restorative property.

2. The method of claim 1, wherein when said pressure sensitive adhesive has an initial thickness of 10 mm and is compressed to 25 % of the initial thickness at a rate of 10 min/mm in a thickness-wise direction, a compressive load is 0.1 to 300 N/cm².

3. The method of claim 1, wherein the tacky polymer is obtained by polymerizing a polymerizable precursor comprising a cross-linikable acrylic monomer.

4. The method of claim 1, wherein the mixture further comprises a radiation-impermeable component.

5. The method of clam 1, wherein the pressure sensitive adhesive has a density of 0.1 to 3.0 g/cm³.

6. A method for producing a pressure sensitive adhesive comprising:
   (a) rolling into a sheet or extruding a mixture comprising a tacky acrylic polymer having a weight average molecular weight of at least 100,000 g/mol, a heat cross-linking agent, and a heat foaming agent that decomposes to generate a gas upon heating, wherein the foaming temperature of the heat foaming agent is lower than the reaction start temperature of the heat cross-linking agent, and wherein the mixture is free of expandable, polymeric microspheres, and
   (b) heating the extruded mixture to a temperature higher than the activation temperatures of both the cross-linking agent and the heat foaming agent to cause foaming and cross-linking,
   wherein the resulting cross-linked foamed pressure sensitive adhesive has cells that are exposed on a surface of the pressure sensitive adhesive.

7. The method of claim 1, wherein the tacky polymer is obtained by polymerizing a non-cross-likable acrylic monomer and a cross-likable acrylic monomer.

8. The method of claim 3, wherein the cross-likable acrylic monomer is present in an amount of 0.1 to 20 parts by weight per 100 parts by weight of the polymerizable prepolymer.

9. The method of claim 7, wherein the cross-likable acrylic monomer is present in an amount of 0.1 to 20 parts by weight per 100 parts by weight of the non-cross-likable acrylic monomer.

10. The method of claim 6, wherein said pressure sensitive adhesive has a thickness of up to 10 cm.

11. The method of claim 6, wherein said rolling or extruding step comprises rolling or extruding at a temperature lower than foaming temperature and the reaction start temperature of the heat cross-linking agent.

12. The method of claim 6, wherein said rolling or extruding step comprises an extruding step.

13. The method of claim 6, wherein said mixture further comprises a non-cross-linkable rubber, elastomer, or thermoplastic polymer.

14. A method for producing a pressure sensitive adhesive comprising:
   (a) rolling into a sheet or extruding a mixture comprising a tacky acrylic polymer having a weight average molecular weight of at least 100,000 g/mol, a heat cross-linking agent, and a heat foaming agent that decomposes to generate a gas upon heating, wherein the foaming temperature of the heat foaming agent is lower than the reaction start temperature of the heat cross-linking agent, and wherein the mixture is free of expandable, polymeric microspheres and said rolling or extruding step is performed at a temperature lower than (i) the foaming temperature and (ii) the reaction start temperature of the heat cross-linking agent, and
   (b) heating the extruded mixture to a temperature higher than the activation temperatures of both the cross-linking agent and the heat foaming agent to cause foaming and cross-linking.

15. The method of claim 14, wherein said heating step comprises heating the mixture to a temperature higher than the activation temperatures of both the cross-linking agent and the heat foaming agent to cause foaming and cross-linking at substantially the same time.

16. The method of claim 14, wherein said heating step comprises:
   heating to a temperature above the foaming temperature of the heat foaming agent but lower than the reaction start temperature of the heat cross-linking agent; and
   then heating to a temperature above the reaction start temperature of the heat cross-linking agent.

17. The method of claim 14, further comprising:
co-extruding or laminating an additional layer to the pressure sensitive adhesive.

18. The method of claim 14, wherein said mixture further comprises a non-cross-linkable rubber, elastomer, or thermoplastic polymer.

19. The method of claim 6, wherein the mixture further comprises a radiation-impermeable component selected from a pigment, a colorant, a metal filler, an inorganic filler, or a combination thereof.

* * * * *

UNITED STATES PATENT AND TRADEMARK OFFICE
CERTIFICATE OF CORRECTION

PATENT NO. : 7,612,121 B2  Page 1 of 2
APPLICATION NO. : 10/363447
DATED : November 3, 2009
INVENTOR(S) : Yasuhiro Mino It is certified that error appears in the above-identified patent and that said Letters Patent is hereby corrected as shown below:

Title Page
Item (65), Prior Publication Data, below "2004", insert -- Sep. 09, 2000 (JP) 2000-267593 --.

Column 3
Line 66, delete "isobonyl" and insert -- isobornyl --, therefor.

Column 4
Line 6, delete "N-vinylpyrolidone," and insert -- N-vinylpyrrolidone, --, therefor.
Lines 57-58, delete "Velsicure" of Bellsicol Co." and insert -- VESIcare" of Velsicol Co. --, therefor.
Line 63, delete "crosslinkable" and insert -- cross-linkable --, therefor.

Column 5
Line 34, delete "bis-isobutylonitrile" and insert -- bis-isobutyronitrile --, therefor.
Lines 44-45, delete "dithiocarbmates" and insert -- dithiocarbamates --, therefor.
Line 46, delete "di-n-butyldithiocarbanmate," and insert -- di-n-dibutyldithiocarbamate, --, therefor.

Column 6
Line 12, delete "dimethylthiocarbamate" and insert -- dimethyldithiocarbamate --, therefor.
Line 24, delete "1 nm." and insert -- 1 mm. --, therefor.

Column 7
Line 1, delete "crosslinked" and insert -- cross-linked --, therefor.
Line 5, delete "crosslinked" and insert -- cross-linked --, therefor.
Lines 15-16, delete "10 mm/mm" and insert -- 10 mm/min --, therefor.

Column 8
Lines 23-24, delete "cumarone" and insert -- coumarone --, therefor.

Signed and Sealed this

Twenty-eighth Day of September, 2010

David J. Kappos
*Director of the United States Patent and Trademark Office*

CERTIFICATE OF CORRECTION (continued)
U.S. Pat. No. 7,612,121 B2

<u>Column 9</u>
Line 26, delete "prepolymner" and insert -- prepolymer --, therefor.

<u>Column 10</u>
Line 20, delete "H1090" and insert -- HP1090 --, therefor.

<u>Column 12</u>
Line 49, delete "measured," and insert -- measured. --, therefor.

<u>Column 15</u>
Line 38, in claim 3, delete "cross-linikable" and insert -- cross-linkable --, therefor.
Line 42, in claim 5, delete "clam" and insert -- claim --, therefor.
Line 63, in claim 7, delete "non-cross-likable" and insert -- non-cross-linkable --, therefor.
Line 64, in claim 7, delete "cross-likable" and insert -- cross-linkable --, therefor.
Line 65, in claim 8, delete "cross-likable" and insert -- cross-linkable --, therefor.

<u>Column 16</u>
Line 16, in claim 9, delete "cross-likable" and insert -- cross-linkable --, therefor.
Line 18, in claim 9, delete "non-cross-likable" and insert -- non-cross-linkable --, therefor.